US010547779B2

(12) United States Patent
Wan et al.

(10) Patent No.: US 10,547,779 B2
(45) Date of Patent: Jan. 28, 2020

(54) SMART IMAGE SENSOR HAVING INTEGRATED MEMORY AND PROCESSOR (71) Applicant: Google LLC, Mountain View, CA (US)

(72) Inventors: Chung Chun Wan, San Jose, CA (US); Choon Ping Chng, Los Altos, CA (US); Suk Hwan Lim, Mountain View, CA (US); Szepo Robert Hung, Santa Clara, CA (US); Blaise Aguera-Arcas, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/155,998

(22) Filed: Oct. 10, 2018

(65) Prior Publication Data
US 2019/0052808 A1 Feb. 14, 2019

Related U.S. Application Data (63) Continuation of application No. 15/236,798, filed on Aug. 15, 2016, now Pat. No. 10,129,477.
(Continued)

(51) Int. Cl.
*H04N 5/232* (2006.01)

(52) U.S. Cl.
CPC ..... *H04N 5/23218* (2018.08); *H04N 5/23212* (2013.01); *H04N 5/23248* (2013.01); *H04N 5/23258* (2013.01)

(58) Field of Classification Search
CPC ............... H04N 5/232; H04N 5/23212; H04N 5/23219; H04N 5/23248; H04N 5/23251;
(Continued)

(56) References Cited

U.S. PATENT DOCUMENTS 5,262,871 A * 11/1993 Wilder .............. H01L 27/14609
257/E27.132
5,541,654 A * 7/1996 Roberts .................. H04N 3/155
348/301
(Continued)

FOREIGN PATENT DOCUMENTS

CN 101146179 A 3/2008
CN 201393267 Y 1/2010
(Continued)

OTHER PUBLICATIONS

CN Office Action issued in Chinese Application No. 201680028443.9, dated Jan. 28, 2019, 10 pages (with English translation).
(Continued)

*Primary Examiner* — Lin Ye
*Assistant Examiner* — Chriss S Yoder, III
(74) *Attorney, Agent, or Firm* — Fish & Richardson P.C.

(57) ABSTRACT

An apparatus is described. The apparatus includes a smart image sensor having a memory and a processor that are locally integrated with an image sensor. The memory is to store first program code to be executed by the processor. The memory is coupled to the image sensor and the processor. The memory is to store second program code to be executed by the processor. The first program code is to cause the smart image sensor to perform an analysis on one or more images captured by the image sensor. The analysis identifies a region of interest within the one or more images with machine learning from previously captured images. The second program code is to cause the smart image sensor to change an image sensing and/or optical parameter in response to the analysis of the one or more images performed by the execution of the first program code.

20 Claims, 10 Drawing Sheets

Related U.S. Application Data (60) Provisional application No. 62/207,232, filed on Aug. 19, 2015.

(58) Field of Classification Search
CPC .......... H04N 5/23254; H04N 5/23258; H04N 5/23264; H04N 5/23277; H04N 5/335; H04N 5/23218; G02B 7/285; G02B 7/32; G06K 9/00973; G06K 9/00986; G06K 9/60

See application file for complete search history.

(56) References Cited

U.S. PATENT DOCUMENTS

| | | | |
|---|---|---|---|
| 5,850,470 | A | 12/1998 | King |
| 6,181,375 | B1* | 1/2001 | Mitsui ............... H04N 5/335 348/206 |
| 6,678,393 | B1 | 1/2004 | Dunton et al. |
| 6,879,340 | B1 | 4/2005 | Chevallier |
| 6,972,791 | B1* | 12/2005 | Yomeyama ........ H04N 5/23241 348/230.1 |
| 7,129,978 | B1 | 10/2006 | Brehmer et al. |
| 8,179,468 | B2 | 5/2012 | Sarwari |
| 8,648,959 | B2* | 2/2014 | Capata ............... G06K 9/00255 348/345 |
| 8,922,663 | B2 | 12/2014 | Ozluturk |
| 9,148,578 | B2 | 9/2015 | Tsubaki |
| 2002/0149689 | A1 | 10/2002 | Sannoh |
| 2002/0149693 | A1 | 10/2002 | Tantalo |
| 2003/0117520 | A1 | 6/2003 | Fossum |
| 2005/0219395 | A1* | 10/2005 | Sugimoto .......... G06K 9/00221 348/333.12 |
| 2006/0054783 | A1 | 3/2006 | Voronov |
| 2006/0072914 | A1 | 4/2006 | Arai |
| 2007/0279516 | A1 | 12/2007 | Ishii |
| 2008/0259181 | A1 | 10/2008 | Yamashita |
| 2009/0080713 | A1* | 3/2009 | Bigioi ................ G06K 9/00228 382/118 |
| 2009/0167883 | A1* | 7/2009 | Nozaki ................ G06T 1/0007 348/222.1 |
| 2011/0285897 | A1 | 11/2011 | Fujii |
| 2014/0184866 | A1 | 7/2014 | Ogushi |
| 2014/0307110 | A1 | 10/2014 | Liu |
| 2016/0182809 | A1 | 6/2016 | Plaza |
| 2016/0381319 | A1 | 12/2016 | Nakajima |

FOREIGN PATENT DOCUMENTS

| | | |
|---|---|---|
| CN | 103647901 A | 3/2014 |
| EP | 1501288 | 1/2005 |
| JP | 2005-077130 | 3/2005 |
| JP | 2008-289120 A | 11/2008 |
| JP | 2009/081808 A | 4/2009 |
| JP | 2011/075965 A | 4/2011 |
| JP | 2013/003501 A | 1/2013 |
| JP | 2013-255035 A | 12/2013 |
| JP | 2015/136093 A | 7/2015 |
| KR | 10-2003-0052515 | 6/2003 |
| WO | WO 2011/067906 | 6/2011 |
| WO | WO 2014138695 | 9/2014 |

OTHER PUBLICATIONS

"Intelligent Camera," Technical Manual XCI-SX1, 2005 Sony Corporation, 35 pages.

"What if your phone could read your face? This 'Mad' couple brings artificial intelligence to the smartphone camera," http://www.techinasia.com/madstreetden-artificial-intelligence-smartphone-camera-can-read-you-face), Aug. 13, 2014, pp. 1-8.

Donegan, T.J. "The Best Smartphone Cameras of 2015," Article—(http://smartphones.reviewed.com/features/best-smartphones-cameras-2015), Jul. 29, 2015, 15 pages.

International Preliminary Report on Patentability issued in International Application No. PCT/US2016/047340, dated Mar. 1, 2018, 12 pages.

Office Action issued in Korean Application No. 10-2017-7031190, dated Jul. 16, 2018, 22 pages (with English Translation).

PCT/US2016/047340—International Search Report and Written Opinion, dated Nov. 1, 2017, 17 pages.

PCT/US2016/047340—Invitation to Pay Additional Fees, dated Nov. 4, 2016, 8 pages.

White, Paul J.F. "Algorithms for smartphone and tablet image analysis for healthcare application," IEEE Access, vol. 2, 2014, pp. 831-840.

JP Office Action in Japanese Appln. No. 2017-555348, dated Mar. 5, 2019, 32 pages (with English translation).

EP Office Action in European Appln. 16763368.4-1208, dated Jun. 24, 2019, 10 pages.

CN Office Action in Chinese Appln. No. 201680028443.9, dated Aug. 5, 2019, 26 pages (with English translation).

\* cited by examiner

SMART IMAGE SENSOR HAVING INTEGRATED MEMORY AND PROCESSOR

CROSS-REFERENCE TO RELATED CASES

This application is a continuation of U.S. application Ser. No. 15/236,798, filed Aug. 15, 2016, which claims the benefit of U.S. Provisional Application No. 62/207,232, filed Aug. 19, 2015, the contents of each are hereby incorporated by reference

FIELD OF INVENTION

The field of invention pertains generally to imaging, and, more specifically, to a camera having an integrated memory and processor.

BACKGROUND

Figure 1:
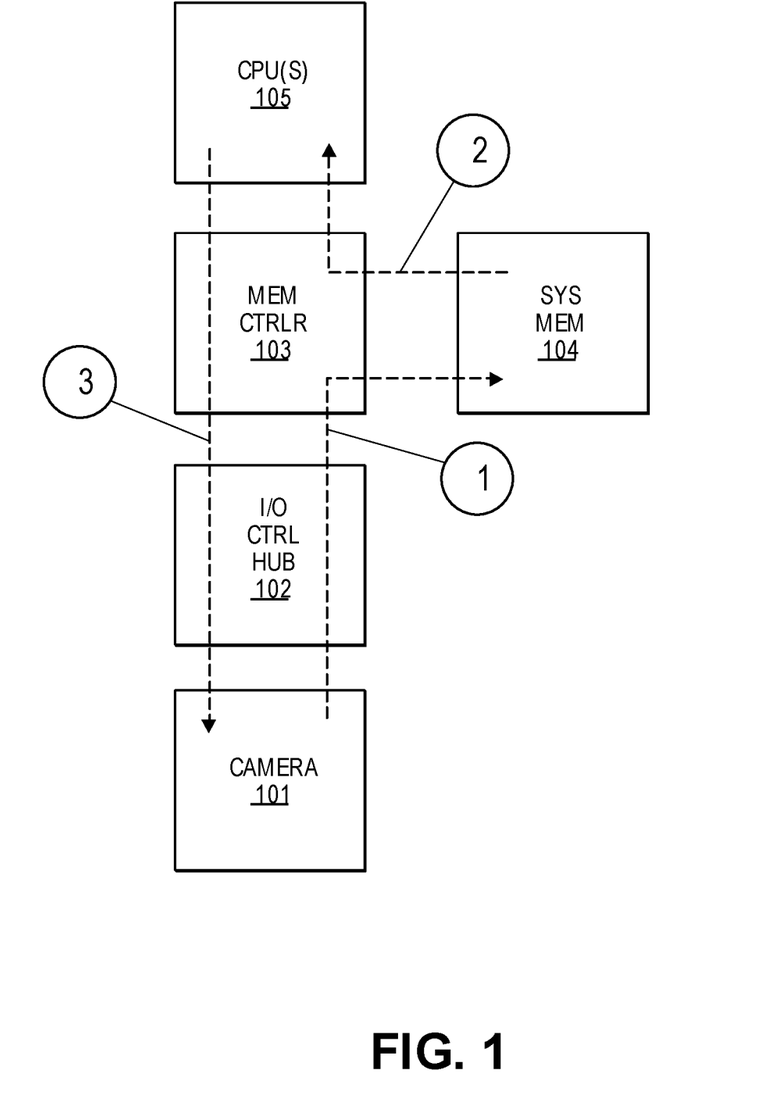
FIG. 1 shows a computing system.

FIG. 1 depicts traditional data flows 1, 2, 3 for camera related functions within a computing system. In many current computing systems, the camera 101 has little or no processing intelligence. As a consequence, complex functions of the camera 101 itself, or, applications that make use of the camera's images are typically executed on the computing system's general purpose processing core(s) 105 (such as one or more applications processors).

As observed in FIG. 1, the execution of these functions/applications on the processing core(s) 105 results in cumbersome movements of large amounts of data within the computing system as well as feedback paths from the core(s) 105 back to the camera 101 having long latencies. The overall inefficiency also corresponds to increased traffic congestion and power consumption by the system.

For example, consider an auto-focus routine that is performed on core(s) 105. Here, entire frames of image data are directed 1 from the camera 101 through an I/O control hub 102 and memory controller 103 before being written into system memory 104. In order for the core(s) 105 to execute the auto-focus routine the image data is called up 2 to the core(s) for processing from system memory 104. Here, large amounts of data are moved along data paths 1 and 2 resulting in long latencies, increased power consumption and traffic congestion within the system.

Additionally, when the auto-focus routine completes its analysis and the core(s) 105 attempt to communicate a next auto-focus command to the camera 101, the command may progress 3 through the memory controller 103 and/or I/O control hub 102 before finally reaching the camera 101. Along the way the command may be queued at different locations within the system. Thus, additional latency is observed from the perspective of the camera 101 from the time the image data is first sent 1 to the time it finally receives a feedback command 3 based on the image data.

SUMMARY

An apparatus is described. The apparatus includes a smart image sensor having a memory and a processor that are locally integrated with an image sensor. The memory is coupled to the image sensor and the processor. The memory is to store first program code to be executed by the processor. The memory is to store second program code to be executed by the processor. The first program code is to cause the smart image sensor to perform an analysis on one or more images captured by the image sensor. The analysis is to identify a region of interest within the one or more images with machine learning from previously captured images. The second program code is to cause the smart image sensor to change an image sensing and/or optical parameter in response to the analysis of the one or more images performed by the execution of the first program code. Alternatively or in combination, the memory is to store third program code to be executed by the processor and fourth program code to be executed by the processor. The third program code is to store multiple images captured by the image sensor in the memory. The fourth program code is to merge the multiple images in the memory.

LIST OF FIGURES

The following description and accompanying drawings are used to illustrate embodiments of the invention. In the drawings.

DETAILED DESCRIPTION

Figure 2:
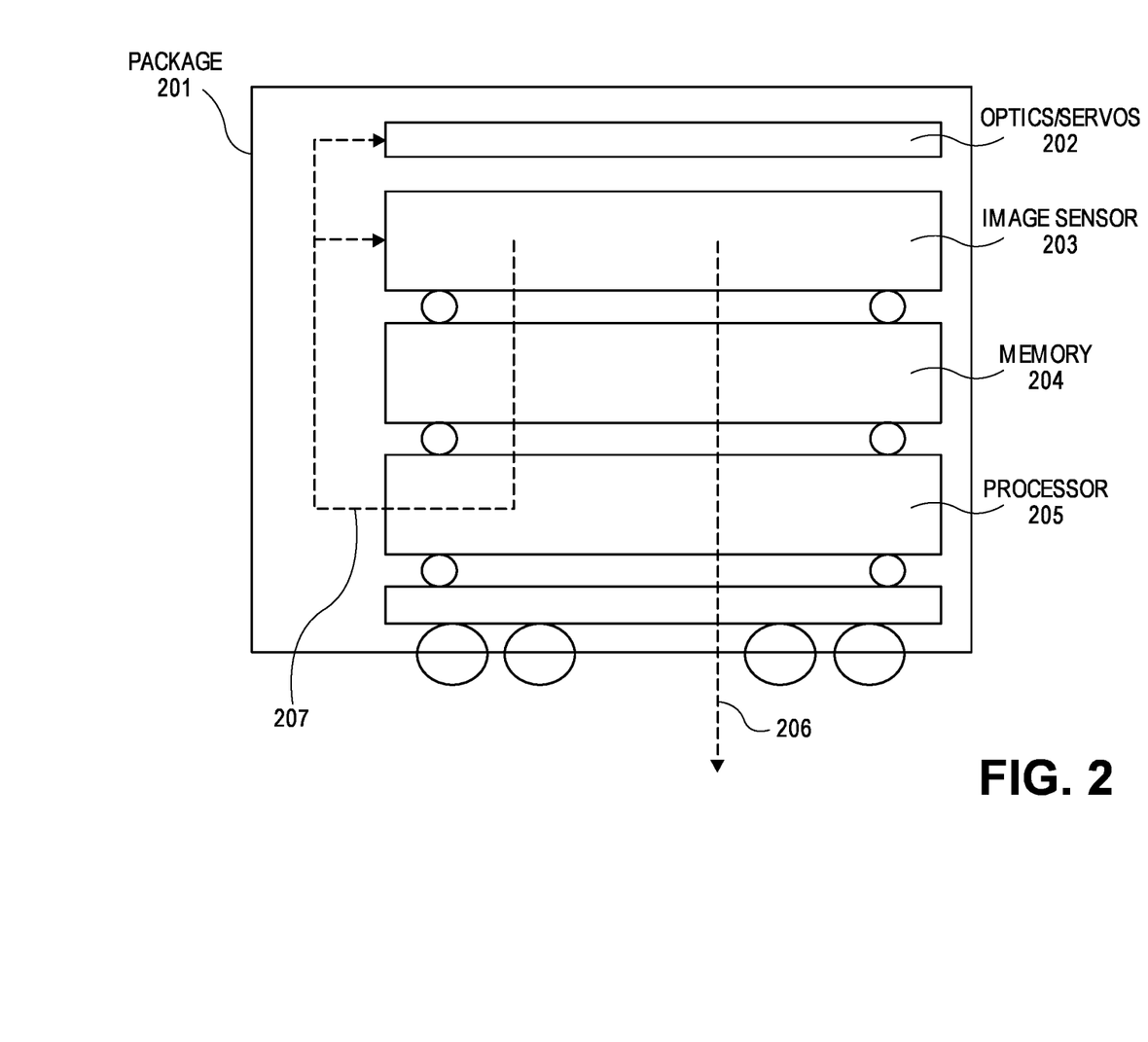
FIG. 2 shows a camera having an integrated memory and processor.

FIG. 2 shows an improved approach that migrates camera-specific processing intelligence into, e.g., the camera package itself 201. As observed in FIG. 2, apart from the typical optics/servos 202 and image sensor 203 being located within the camera package 201 there also exists memory 204 and a processor 205. As observed in FIG. 2, the various devices 202 through 205 may be stacked within the camera package 201. By combining all of these components 202 through 205 in a single camera package 201 many camera specific functions may be executed within the camera itself thereby avoiding the length and inefficient flow up to system memory and beyond.

In other embodiments the processor 205 and/or memory 204 may reside outside the camera package 201 but are nevertheless placed physically and/or architecturally close to the camera package 201 so as to eliminate the cumbersome pathways discussed above with respect to FIG. 1.

As observed in FIG. 2 some unique data flows may be entertained local to the camera 201. Flow 206 corresponds to a flow in which the camera 201, because of the internal processing intelligence achieved with processor 205, is able to analyze the image data and recognize a smaller region of interest. Therefore, only the smaller footprint sized data of the region of interest is sent from the camera, e.g., to system memory for further processing by an applications processor so as to effectively reduce the total amount of data that needs to be forwarded through the system to be processed by the computer system's general purpose CPU core(s).

Flow 207 represents another flow in which the camera, again because of the processing intelligence realized with processor 205, is able to independently control its various internal functions based on its own analysis of the image data. For example, based on the camera processor's own analysis of the data, new auto-focus settings may be set and/or new exposure times may be set.

In operation, the optics 202 and image sensor 203 capture an image consistent with standard camera operation. However rather than immediately direct the image data out of the camera, the novel camera of FIG. 2 will instead write the image data in its local memory 204. Apart from storing image data, memory 204 may also be used to store program code that is executed by processor 205. Thus, the processor 205 executes out of memory 204 in performing its various applications.

Figure 3:
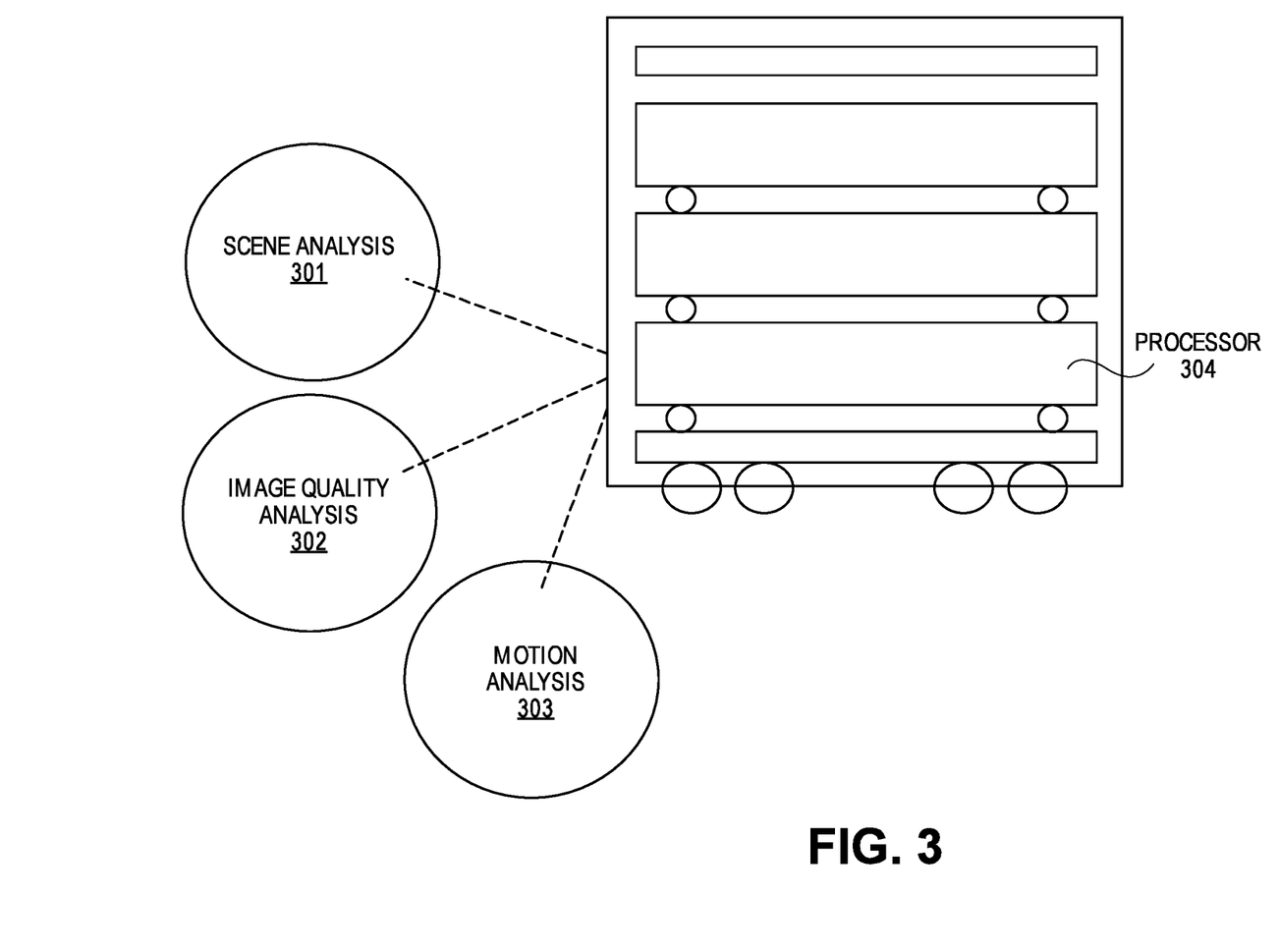
FIG. 3 shows application software that may run on the camera of FIG. 2.

FIG. 3 provides a high level view of some of the types of applications that the local camera processor 304 can execute. As observed in FIG. 3 some of the potential applications include scene analysis 301 functions (e.g., object recognition, auto-focusing), image quality analysis 302 (e.g., to determine an appropriate exposure time setting, image resolution or dynamic range), and motion analysis 303 (e.g., to establish whether a high or low frame rate is appropriate based on movement of features within an image or lack thereof).

In another embodiment, the image sensor within the camera includes banks of analog-to-digital converters having different resolutions and/or dynamic ranges. According to various image quality tasks, the processor may enable certain ones of the ADCs while disabling others. For example, if based on an analysis of the image low resolution is suitable (because the image has largely uniform imagery) the internal processor may send a command to the image sensor to enable the low resolution/low dynamic range ADCs and disable the higher resolution/high dynamic range ADCs.

Figure 4A:
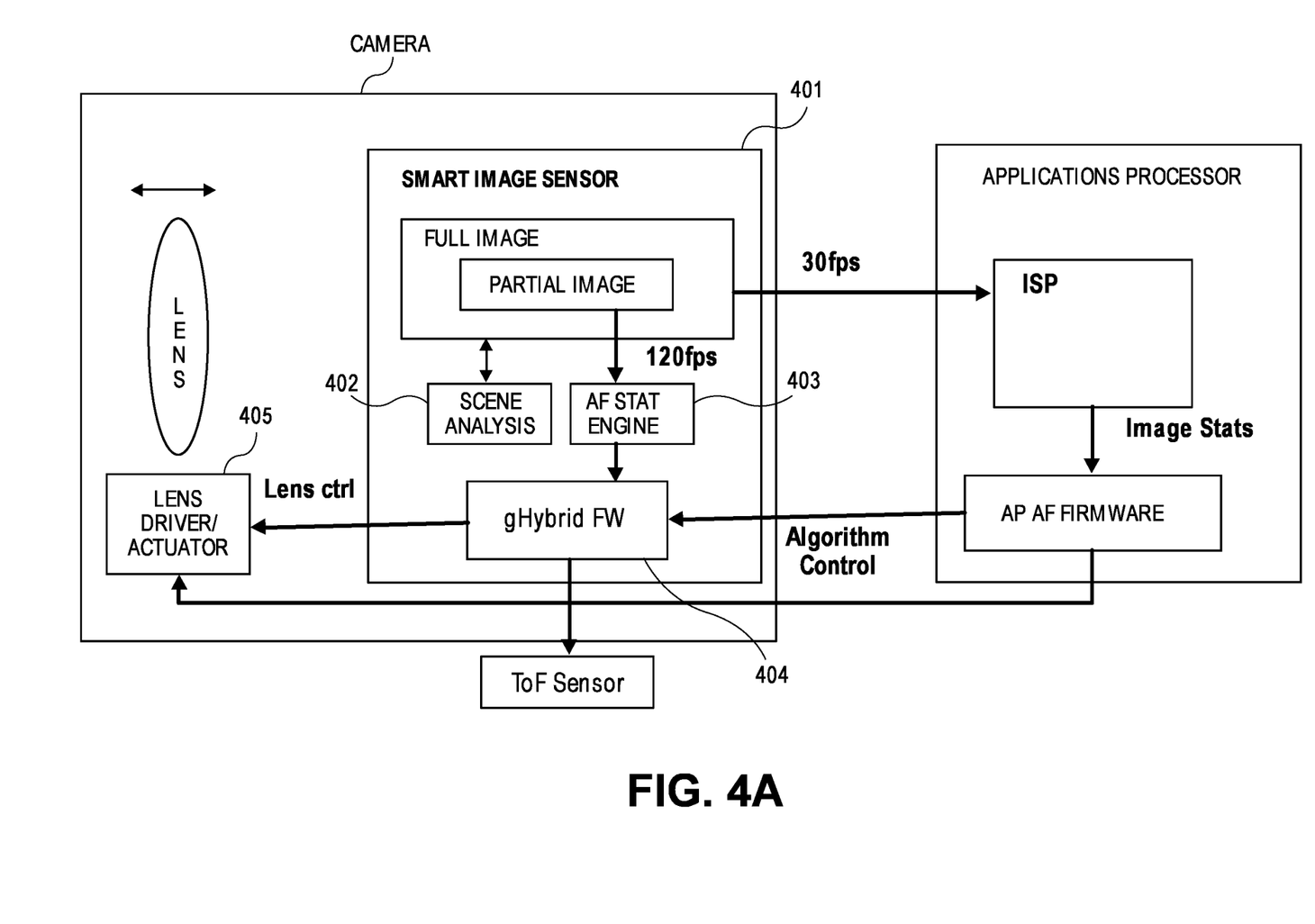
FIGS. 4a and 4b pertain to an auto-focus approach that may be performed by the camera of FIG. 2.

FIGS. 4a and 4b provide additional details regarding an auto-focus embodiment of an intelligent camera. As observed in FIG. 4a the image sensor, memory and processor of the camera can together be viewed as a smart image sensor 401. The smart image sensor 401 is able to perform scene analysis with an image analysis engine 402 as, e.g., an initial part of its auto-focus routine. As auto-focus routines can be numerically intensive, the smart image sensor also includes a statistics engine 403 to collect, update and/or otherwise process the auto-function numerics. The smart image sensor can most advantageously be integrated into a single circuit package, and is most preferably a system on a chip.

A hybrid auto focus engine 404 may also perform the routines/tasks of any one or more of: 1) laser based auto-focus; 2) phase detection based auto-focus; or, 3) contrast based auto-focus. Any or all of the scene analysis engine 402, the stats engine 403, and the hybrid auto focus engine 404 may be implemented as program code that is executed by the processor of the smart image sensor out of the camera's memory.

In an embodiment, the smart image sensor 401 performs auto-focus routines on smaller sized ("partial") images that are processed at a faster frame rate (e.g., 120 frames per second (fps)). Because of the faster frame rate, the smart image sensor is able to perform auto-focus more rapidly than traditional implementations. Any full sized auto-focus information that needs to be forwarded up to the general purpose cores (if any) may be provided at a slower frame rate (e.g., 30 fps) to reduce the total rate of data passed externally through the system.

The smart image sensor 401 may also directly provide commands to the lens servos/actuators 405 to control lens positioning as part of the auto-focusing function. Additionally, e.g., in the case of laser based auto-detection schemes, the smart sensor may directly provide commands to a laser device that is also used to generate laser light for time-of-flight depth imaging.

Figure 4B:
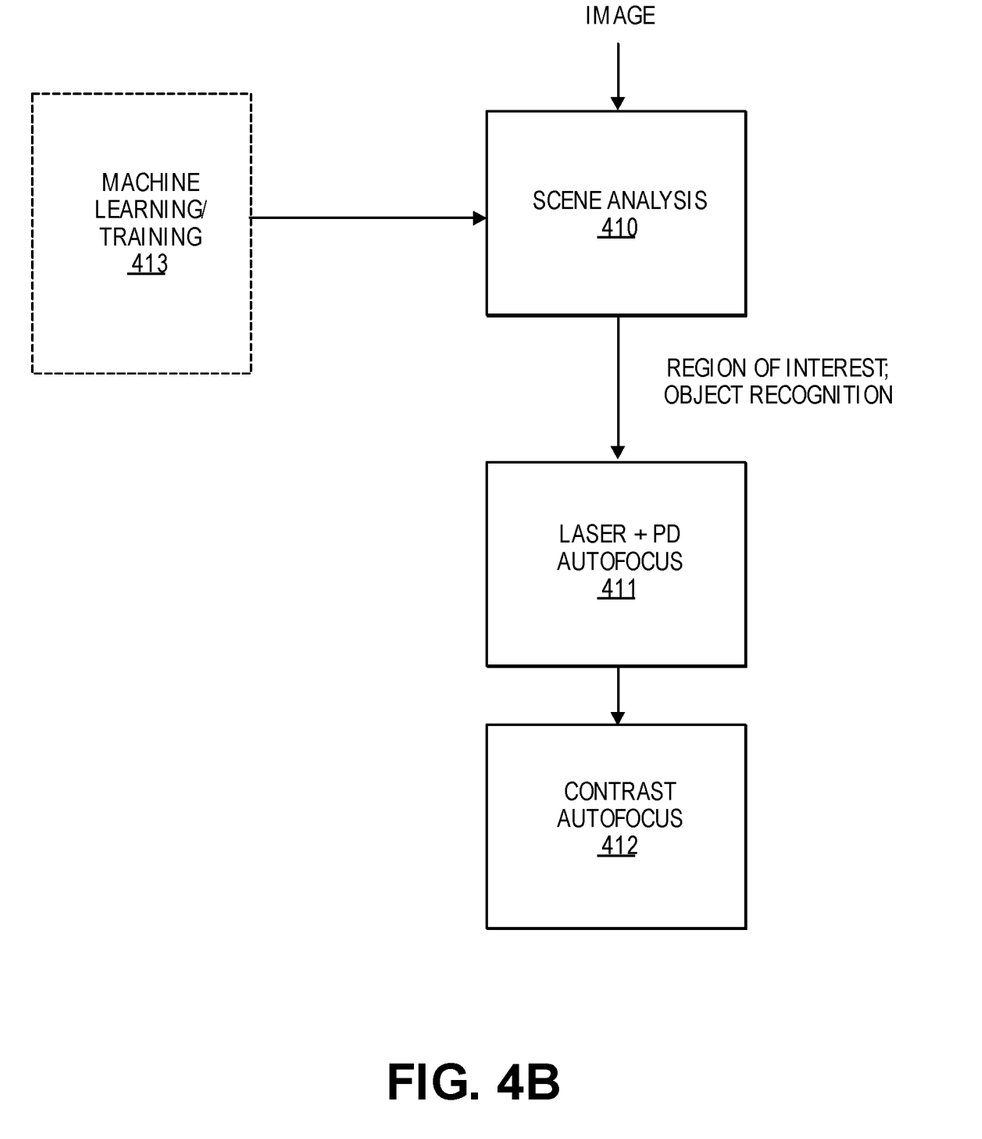

FIG. 4b shows an auto-focusing methodology that can be performed by the camera system of FIG. 4a. As observed in FIG. 4b, the auto-focus routine initially performs scene analysis 410 to, e.g., recognize an object of interest that is to be focused upon. The object recognition of the scene analysis may be performed on a smaller footprint of the data or "partial image" (e.g., operate over every other line or every third line within the image).

Additionally, some degree of machine learning or training 413 may be applied beforehand and/or commensurate with the scene analysis 411. Here, apart from recognizing the mere existence of a profile of a generic person within the profile, the scene analysis function 411 may be smart enough to recognize a specific person within the image based on previously taken images.

Here, a machine learning process 413 may scrutinize previous pictures/images taken by the camera (e.g., and stored in the device's photo library) and recognize that a picture of a particular person is frequently being taken. The machine learning function 413 may then build a facial recognition profile of the specific person and, when performing scene analysis 410, may seek or otherwise flag the person's face in the image currently being taken (e.g., in the background amongst a crowd of people) as the region of interest to be focused upon. Essentially, any object that the previous history of captured images demonstrates an interest by the picture taker can be used to build a specific profile for the object that the scene analysis function 410 uses to determine a region of interest to be focused upon.

After the region of interest is determined by the scene analysis process 410, more than one type of auto-focus technique may be applied to rapidly bring the lens position "in the ballpark" of the correct focus position 411 (note also that, image quality analysis and/or motion analysis may also be performed (along with or separate from auto-focusing) on one or more images or a region of interest within one or more images in response to a machine learning based identification of the region of interest). In the particular type of embodiment of FIG. 4b, two different auto-focus techniques are concurrently applied: laser and phase detection (PD). After the concurrent application of the two different auto-focus techniques have settled on an approximately correct lens location and the servo has been adjusted accordingly, a third auto-focus technique (contrast) is applied 412 to finally bring the lens to what is understood to be the finally correct position. Thus, process 411 acts as a kind of course adjustment and process 412 acts as a kind of fine adjustment.

Figure 5A:
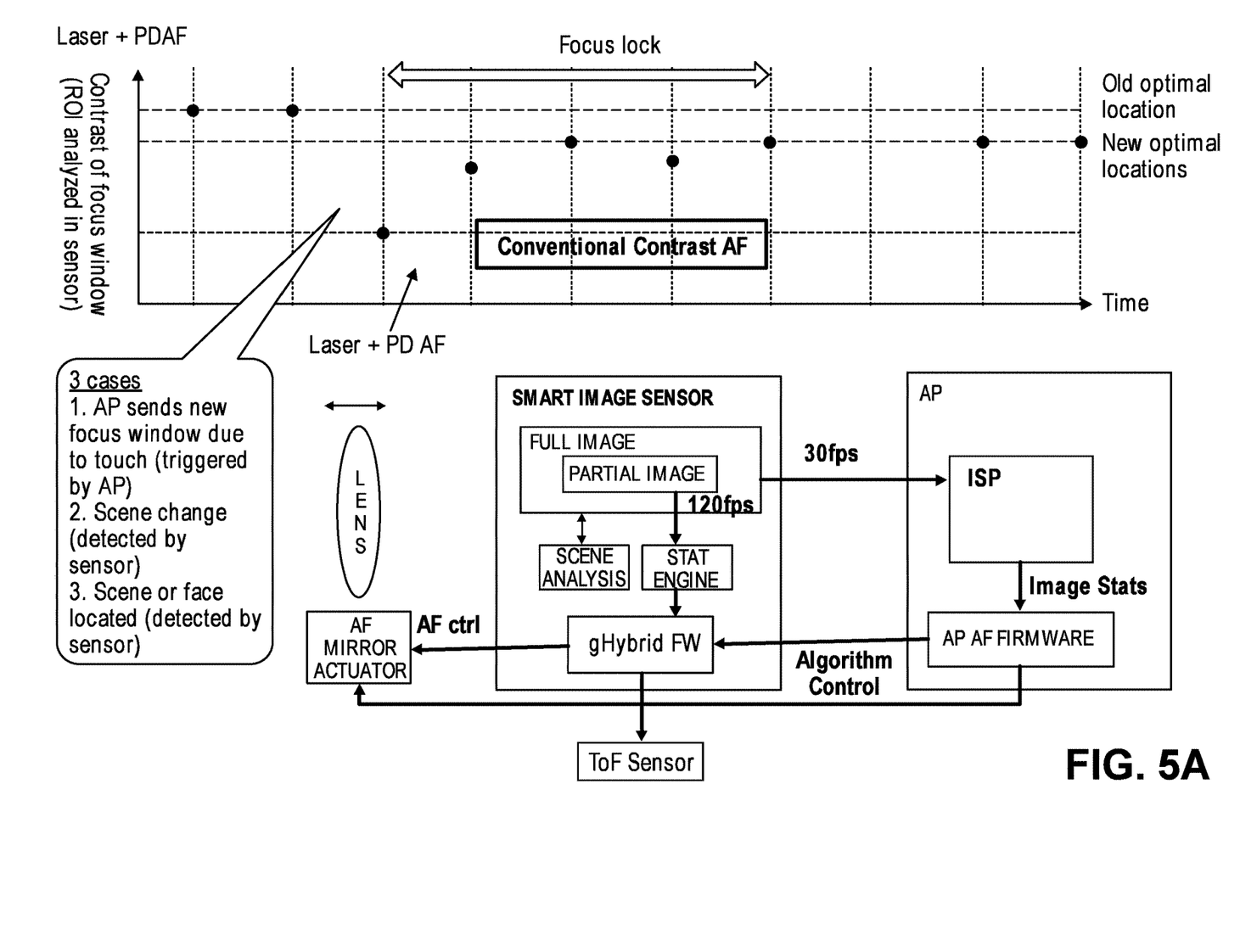
FIGS. 5a through 5c also pertain to an auto-focus approach that may be performed by the camera of FIG. 2.

FIGS. 5a through 5c demonstrate some various perspectives of the aforementioned auto-focus technique. FIG. 5a shows a first embodiment in which the camera performs scene analysis 410 and the initial concurrent auto focusing 411 using laser auto-focus and phase detection auto-focus. The contrast auto focusing 412, however, is performed by the applications processor on larger frames having a slower frame rate. Note that the auto-focus can be triggered by the application's processor detecting some user interface activity, or the camera detecting a change in scene or detecting a specific object having a machine learned object recognition profile.

Figure 5B:
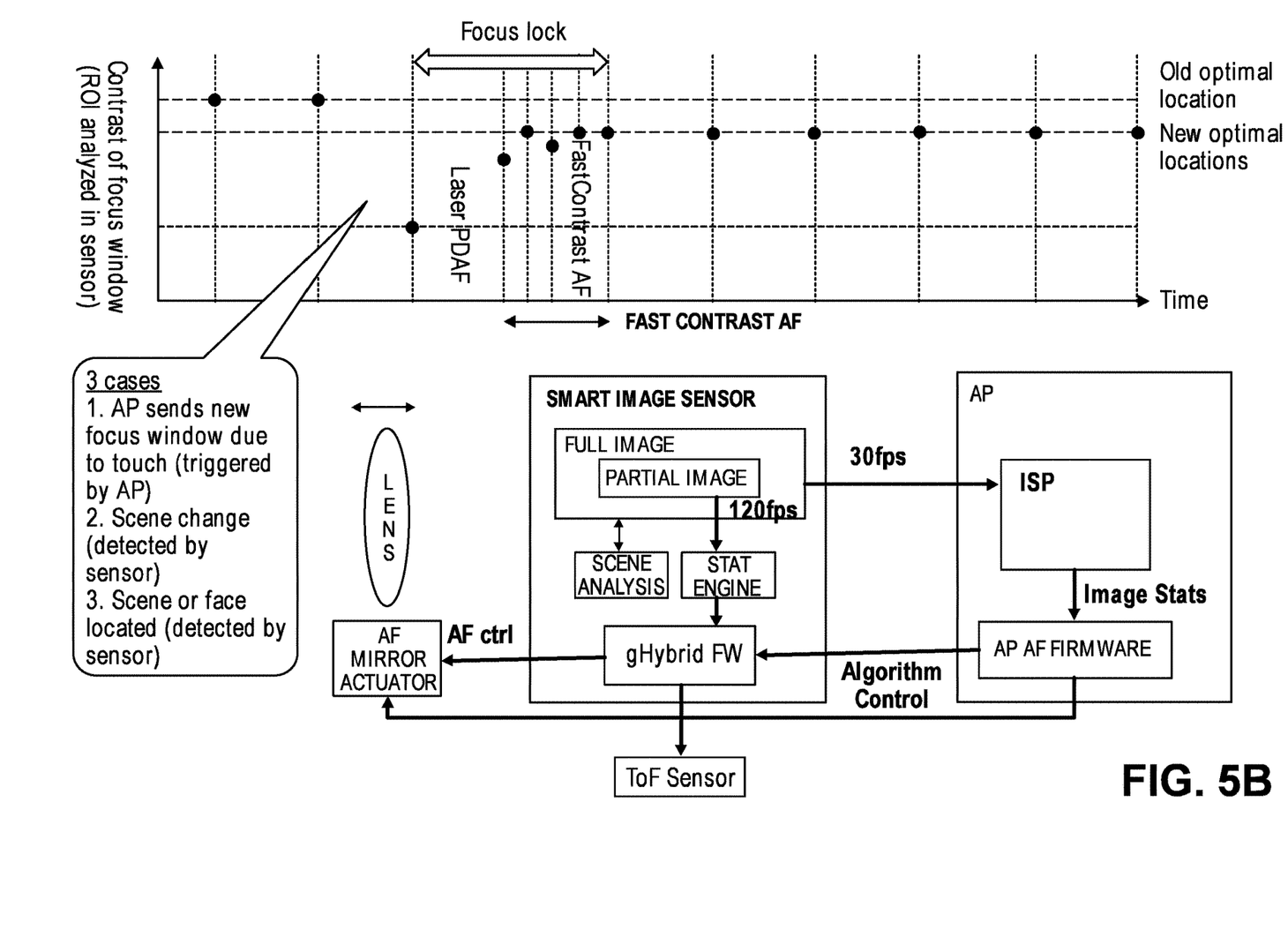

FIG. 5b shows a second embodiment in which the camera not only performs the initial laser and phase detect auto focus 411 but also performs the laser contrast based auto focus 412. Comparing FIGS. 5a and 5b, note how much faster the camera is able to auto-focus because the long latency feedback loop between the camera and applications processor has been eliminated and the camera operates on smaller images with a faster frame rate.

Figure 5C:
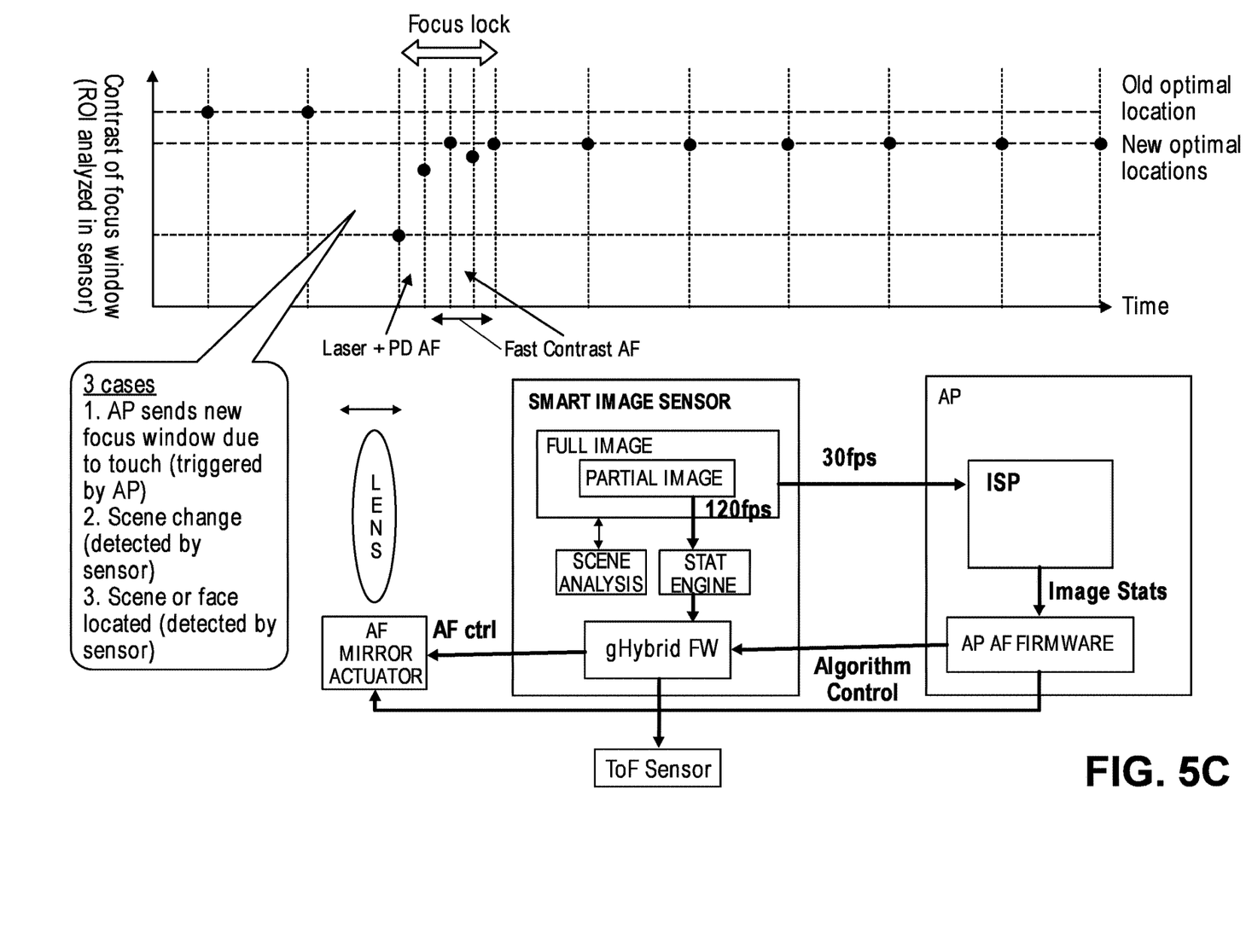

FIG. 5c shows a third embodiment that is similar to the embodiment 5b in terms of approach but the camera acts more aggressively (faster) during the initial laser and phase detect auto focus sequence. Here, faster laser and phase detect auto focus may be achieved with faster rates (and possible larger images) and faster clock speeds. Generally, FIGS. 5b and 5c represent a trade-off between performance (how fast the auto focus is achieved) and power consumption.

Figure 6A:
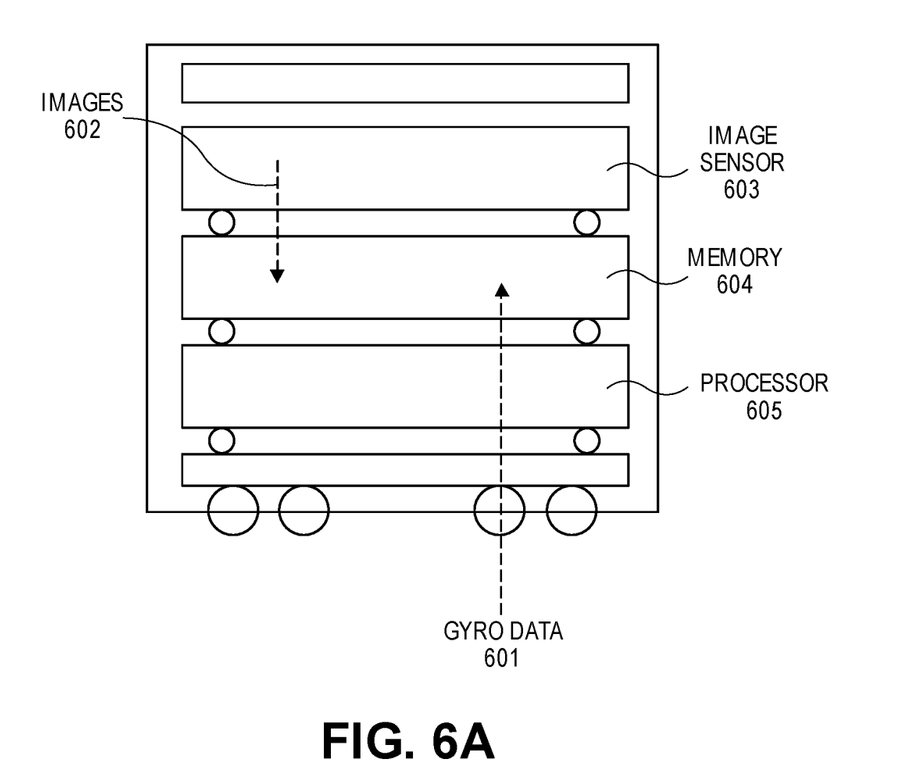
FIGS. 6a and 6b pertain to a technique for performing EIS for a still image with the camera of FIG. 2.
Figure 6B:
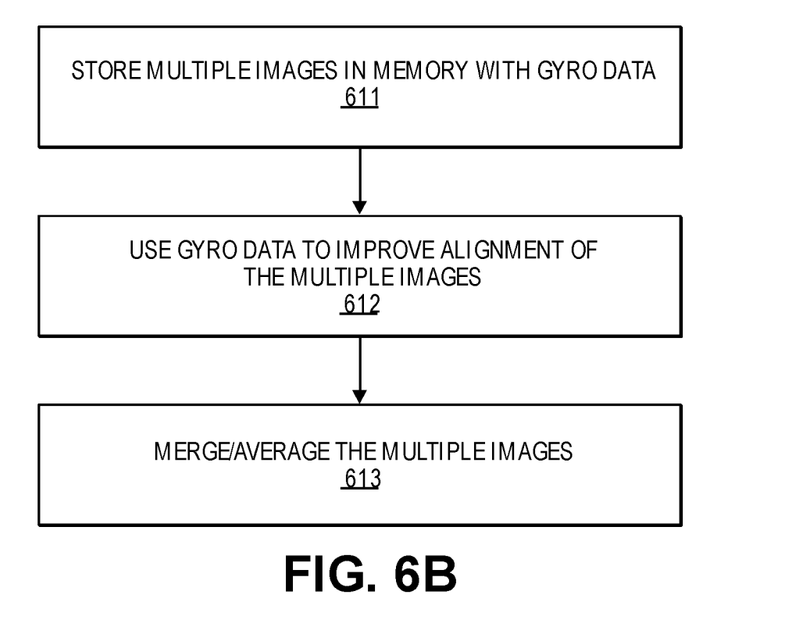

FIGS. 6a and 6b pertain to yet another use of a smart camera as descried herein. As is understood in the art there are two types of image stabilization: optical image stabilization (OIS) and electronic image stabilization (EIS). Image stabilization is a technology that adjusts the image content in response to and to offset any "shaking" of the camera. For example, if the hand of a person who is taking a picture with a handheld device is shaking, image stabilization will attempt to remove the effects of the hand movement from the observed image.

A perspective exists that EIS is generally superior to OIS in all respects (video, power consumption, cost) except in the case of the taking of a still image (i.e., a single picture is being taken). In the case of a still image with OIS, because the camera is shaking at some rate, the camera optics are readily adjusted/moved in response to the shaking to essentially increase the exposure time and provide for a better quality image. Here, the mechanical camera optics are designed to immediately react to the data from a gyroscope so as to remove the applications processor from the stabilization process. By contrast, traditional EIS has to time-stamp the images and forward the time-stamped images up to the applications processor. Additionally, the gyroscope information is also time-stamped and compared to the timestamps of the images so the position of the camera can be understood by the applications processor for each image. Because of the feedback latency discussed at length above, a traditional computing system has difficulty reacting to the hand movement with sufficient speed to perform EIS in the case of the taking of a still image.

FIGS. 6a and 6b pertain to an embodiment for performing EIS for still images having substantially reduced latency because the EIS stabilization is performed locally by the camera. Here, FIG. 6a shows a first data flow 601 in which information describing the shaking from a gyroscope (or other device that generates information describing movement of the camera) is streamed into the camera's memory 604. Additionally, FIG. 6a shows a second flow 602 in which the images captured by the image sensor 603 are also stored in memory 604. Thus, each captured image has associated gyroscope meta data in memory 604.

FIG. 6b shows a process that may be executed, e.g., by the camera processor 605 as software and/or dedicated custom logic circuitry within the camera (to speed up the processing as compared to software execution). As observed in FIG. 6b, and as discussed above, still images captured by the image sensor and gyro data for those images are stored 611 in memory 604. The storage of the images in memory may be in response to recognition by a scene analysis function (such as machine learning program code) of a region of interest within the images.

The gyro data is then used to align the images 612. Here, for instance, if the gyro data for image #2 indicates the camera moved 1 mm to the left after image #1, the camera intelligence will (electronically) move image #2 effectively 1 mm to the right to offset the hand movement recorded by the gyro scope. The imagery of images #1 and #2 are therefore aligned. A similar sequence can be accomplished, e.g., for multiple images, e.g., between 5 and 10 images (inclusive), so that all of the multiple images are effectively aligned.

The multiple, now aligned images are then merged 613. The merger can be accomplished, e.g., by adding the aligned pixel values of the image and dividing by the number of images to effectively produce an average value for each position in the image. The merger operation effectively increases the exposure time for the image which is the main object of image stabilization (without image stabilization, with the camera moving, it is difficult to take a higher quality image (longer exposure time) without blurring). The processor may perform the merger 613 in software, or, in order to speed up the merge process, a stand along custom logic circuit (e.g., as a co-processor to the processor) may be instantiated within the camera to rapidly perform the merger 613. In various embodiments, a custom merge circuit block may have an architecture that consists of many cores with each of them being fully programmable. This architecture may consist of an input/output unit that has AXI4, MIPI, and AHB/APB buses through them to achieve system connectivity. It can also consist of a storage/line buffer pool (e.g. SRAMs) and 2D SIMD compute (cores).

Figure 7:
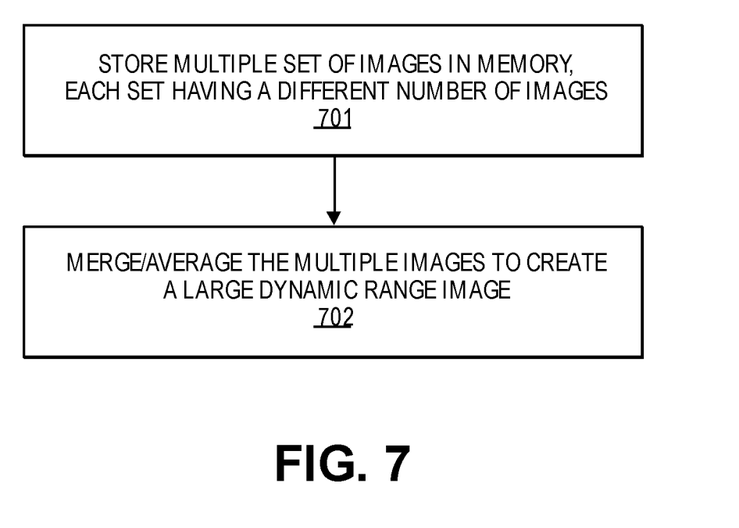
FIG. 7 pertain to a technique for producing high dynamic range video images with the camera of FIG. 2.

FIG. 7 pertains to another methodology that may be performed by an intelligent camera. The methodology of FIG. 7 pertains to the generation of high dynamic range images. Dynamic range corresponds to the ability to detect both low intensity signals and high intensity signals.

According to the methodology of FIG. 7, different sets of images are taken and stored in the camera memory where the different sets of images have a different number of images 701 (the storage of the images in memory may be in response to recognition by a scene analysis function (such as machine learning program code) of a region of interest within the images). For example, a first set may only have three images, another set may have five images, another set may have 10 images, etc. Here, sets with more images effectively correspond to a single image with longer exposure time and therefore will be able to accurately detect weaker signals. By contrast, sets with fewer images effectively correspond to a single image with smaller exposure time and therefore will be able to accurately detect stronger signals.

The sets of images are then merged to produce a high dynamic range video stream 702. Here, for instance, if the video stream is being taken in a dark room, the video stream can be composed of an averaging of the set or sets having more images. Likewise, if the video stream is being taken in a bright room, the video stream can be composed of an averaging of the set or sets having fewer images. Further still, if regions of a same image frame have both regions of high intensity and regions of low intensity, the portions of the image frame having high intensity can be established from the sets having fewer images and the portions of the image frame having low intensity can be established from the sets having more images so as to produce a single frame with high dynamic range.

The methodology of FIG. 7 may be performed entirely in software by the camera processor. In another embodiment, a custom logic circuit is instantiated in the camera to speed-up the averaging and/or merger of the different sets of images into the single video stream. In various embodiments, the custom circuit block may have an architecture that consists of many cores with each of them being fully programmable.

This architecture can consist of an input/output unit that has AXI4, MIPI, and AHB/APB buses through them to achieve system connectivity. It can also consist of a storage/line buffer pool (e.g. SRAMs) and 2D SIMD compute (cores).

It is pertinent to point out that the teachings above may be applied to any of: a stand alone camera or a camera integrated with or into a computer system such as a server, a desktop, a laptop, a tablet, a smartphone or other handheld device or a smart appliance.

The camera may also include non volatile memory to store the program code executed by the camera processor, or, such code may be loaded into the camera memory during boot-up of the system.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   a smart image sensor configured for communication with a general purpose central processing unit, the smart image sensor comprising a memory and a processor that are locally integrated with an image sensor within a same semiconductor chip package, the memory being coupled to the image sensor and the processor, and the memory storing program code to be executed by the processor and store previously captured images, the program code to cause the smart image sensor to perform operations comprising:
      identifying, using the processor that is locally integrated with the image sensor within the same semiconductor chip package and without transmitting the current image captured by the smart image sensor to the general purpose central processing unit that is outside of the semiconductor chip package, and based on other images previously captured by the smart image sensor and stored in the memory, a region of interest in a current image captured by the smart image sensor; and
      in response to identifying the region of interest by the processor that is locally integrated with the image sensor within the same semiconductor chip package, transmitting, to the general purpose central processing unit that is outside of the semiconductor chip package, a partial image that corresponds to the region of interest in the current image captured by the smart image sensor and that does not include one or more portions of the current image that are not within the region of interest, wherein the partial image is smaller in size than the current image captured by the smart image sensor.

2. The apparatus of claim 1, wherein the partial image is transmitted to a system memory that is outside of the semiconductor chip package and that is accessible to the general purpose central processing unit.

3. The apparatus of claim 1, wherein identifying the region of interest comprises:
   identifying a particular face in the other images previously captured by the smart image sensor and stored in the memory that matches a current face in the current image; and
   in response to identifying the particular face in the other images previously captured by the smart image sensor and stored in the memory that matches the current face in the current image, identifying one or more regions of interest around the current face in the current image.

4. The apparatus of claim 1, wherein identifying the region of interest comprises:
   identifying an object of interest based on machine learning from the other images previously captured by the smart sensor and stored in the memory; and
   identify the region of interest in the current image based on the object of interest identified.

5. The apparatus of claim 1, wherein transmitting the partial image comprises:
   transmitting the partial image as a portion of the current image.

6. The apparatus of claim 1, wherein the smart image sensor transmits the partial image in response to the smart image sensor switching from a laser based auto-focus mode to a contrast based auto-focus mode.

7. The apparatus of claim 1, wherein the operations comprise:
   obtaining a value of an optical parameter for a camera from the general purpose central processing unit in response to transmitting the partial image to the general purpose central processing unit.

8. A non-transitory machine readable medium that, along with a processor, is locally integrated with an image sensor within a same semiconductor chip package of a smart image sensor that is configured for communication with a general purpose central processing unit, the medium storing program code to be executed by the processor and store previously captured images, the program code to cause the smart image sensor to perform operations comprising:
   identifying, using the processor that is locally integrated with the image sensor within the same semiconductor chip package and without transmitting the current image captured by the smart image sensor to the general purpose central processing unit that is outside of the semiconductor chip package, and based on other images previously captured by the smart image sensor and stored in the medium, a region of interest in a current image captured by the smart image sensor; and
   in response to identifying the region of interest by the processor that is locally integrated with the image sensor within the same semiconductor chip package, transmitting, to the general purpose central processing unit that is outside of the semiconductor chip package, a partial image that corresponds to the region of interest in the current image captured by the smart image sensor and that does not include one or more portions of the current image that are not within the region of interest, wherein the partial image is smaller in size than the current image captured by the smart image sensor.

9. The medium of claim 8, wherein the partial image is transmitted to a system memory that is outside of the semiconductor chip package and that is accessible to the general purpose central processing unit.

10. The medium of claim 8, wherein identifying the region of interest comprises:
   identifying a particular face in the other images previously captured by the smart image sensor and stored in the memory that matches a current face in the current image; and
   in response to identifying the particular face in the other images previously captured by the smart image sensor and stored in the memory that matches the current face in the current image, identifying one or more regions of interest around the current face in the current image.

11. The medium of claim 8, wherein identifying the region of interest comprises:
   identifying an object of interest based on machine learning from the other images previously captured by the smart sensor and stored in the memory; and
   identify the region of interest in the current image based on the object of interest identified.

12. The medium of claim 8, wherein transmitting the partial image comprises:
   transmitting the partial image as a portion of the current image.

13. The medium of claim 8, wherein the smart image sensor transmits the partial image in response to the smart image sensor switching from a laser based auto-focus mode to a contrast based auto-focus mode.

14. The medium of claim 8, wherein the operations comprise:
   obtaining a value of an optical parameter for a camera from the general purpose central processing unit in response to transmitting the partial image to the general purpose central processing unit.

15. A computer-implemented method comprising:
   identifying, using a processor that is locally integrated with an image sensor and a memory within a same semiconductor chip package of a smart image sensor, and without transmitting a current image captured by the smart image sensor to a general purpose central processing unit that is outside of the semiconductor chip package, and based on other images previously captured by the smart image sensor and stored in the memory, a region of interest in a current image captured by the smart image sensor; and
   in response to identifying the region of interest by the processor that is locally integrated with the image sensor within the same semiconductor chip package, transmitting, to the general purpose central processing unit that is outside of the semiconductor chip package, a partial image that corresponds to the region of interest in the current image captured by the smart image sensor and that does not include one or more portions of the current image that are not within the region of interest, wherein the partial image is smaller in size than the current image captured by the smart image sensor.

16. The method of claim 15, wherein the partial image is transmitted to a system memory that is outside of the semiconductor chip package and that is accessible to the general purpose central processing unit.

17. The method of claim 15, wherein identifying the region of interest comprises:
   identifying a particular face in the other images previously captured by the smart image sensor and stored in the memory that matches a current face in the current image; and
   in response to identifying the particular face in the other images previously captured by the smart image sensor and stored in the memory that matches the current face in the current image, identifying one or more regions of interest around the current face in the current image.

18. The method of claim 15, wherein identifying the region of interest comprises:
   identifying an object of interest based on machine learning from the other images previously captured by the smart sensor and stored in the memory; and
   identify the region of interest in the current image based on the object of interest identified.

19. The method of claim 15, wherein transmitting the partial image comprises:
   transmitting the partial image as a portion of the current image.

20. The method of claim 15, wherein the smart image sensor transmits the partial image in response to the smart image sensor switching from a laser based auto-focus mode to a contrast based auto-focus mode.

* * * * *